US008602269B2

(12) United States Patent
Alluigi

(10) Patent No.: US 8,602,269 B2
(45) Date of Patent: Dec. 10, 2013

(54) TRIGGER SPRAYER

(75) Inventor: Riccardo Alluigi, Acqui Terme (IT)

(73) Assignee: Guala Dispensing S.p.A., Alessandria (IT)

( * ) Notice: Subject to any disclaimer, the term of this patent is extended or adjusted under 35 U.S.C. 154(b) by 14 days.

(21) Appl. No.: 13/230,949

(22) Filed: Sep. 13, 2011

(65) Prior Publication Data

US 2012/0018456 A1 Jan. 26, 2012

Related U.S. Application Data

(63) Continuation-in-part of application No. 13/148,074, filed as application No. PCT/IB2010/052369 on May 27, 2010.

(30) Foreign Application Priority Data

Sep. 14, 2009 (IT) .............................. BS2009A0166

(51) Int. Cl.
*B65D 88/54* (2006.01)
*G01F 11/00* (2006.01)
*B67B 1/00* (2006.01)

(52) U.S. Cl.
USPC ............... 222/321.8; 222/153.13; 222/153.11

(58) Field of Classification Search
USPC .................... 222/321.8, 384, 153.13, 153.11, 222/402.11; 24/16 PB, 17 AP, 256
See application file for complete search history.

(56) References Cited

U.S. PATENT DOCUMENTS 3,913,841 A * 10/1975 Tada ............................ 239/321
4,373,644 A * 2/1983 Bennett .................... 222/153.13
4,377,106 A * 3/1983 Workman et al. ................ 92/23
4,384,660 A * 5/1983 Palmisano et al. ....... 222/153.07
4,441,633 A * 4/1984 Bennett .................... 222/153.13
5,503,302 A * 4/1996 DeJonge ......................... 222/82
8,104,643 B2 * 1/2012 Pruvot ..................... 222/153.13
2004/0182884 A1 * 9/2004 Tada ........................ 222/153.13
2010/0237102 A1 * 9/2010 Margheritis ............. 222/153.06

FOREIGN PATENT DOCUMENTS

DE 20212898 U1 2/2003
EP 0449046 A2 10/1991
WO 2007/008375 A2 1/2007
WO 2011/077112 A1 6/2011

OTHER PUBLICATIONS

International Search Report issued in corresponding International Patent Application No. PCT/IB2010/052369 dated Aug. 17, 2010 (3 pages).

International Preliminary Report on Patentability issued in corresponding International Patent Application No. PCT/IB2010/052369 dated Feb. 24, 2011 (7 pages).

* cited by examiner

*Primary Examiner* — Paul R Durand
*Assistant Examiner* — Benjamin R Shaw
(74) *Attorney, Agent, or Firm* — Kilyk & Bowersox, P.L.L.C.

(57) ABSTRACT

A dispenser head (1) comprises a main body (2), an arm (60) hinged to the main body (2) and pumping means. The pumping means comprise a main cylinder (12), a sliding piston (16), dispensing means sensitive to pressure. The arm (60) is hinged to the main body (2) in a hinging portion (**60*b*) distanced radially from the body axis (X), straddling the body axis (X) and transmitting an axial translation movement to the piston (16) by means of an elastically yielding element (30**). A removable lock or tab can be included as a safety means.

20 Claims, 5 Drawing Sheets

TRIGGER SPRAYER

The present application is a continuation-in-part of U.S. patent application Ser. No. 13/148,074, filed Aug. 5, 2011, which in turn is a National Phase Entry of and claims the benefit of earlier filed International Application No. PCT/IB2010/052369 filed May 27, 2010, which, in turn, claims priority from Italian Patent Application No. BS2009A000166, filed Sep. 14, 2009.

The present invention relates to a dispenser device for dispensing a liquid in a nebulised form.

Nebulisation dispensing devices are able to dispense a liquid in the form of minute drops and are extremely widespread in various sectors, having features making them suited to their use.

For example, in the cosmetics sector, and in particular that of perfumery, the dispensing devices are generally called "finger pumps", they are activated by pressing the dispenser head with a finger to dispense very small quantities of perfume in an extremely nebulised form.

In the detergents sector however, trigger dispensing devices are normally used, particularly suitable for dispensing generally large quantities of liquid, with a coarser nebulisation.

The known solutions have several drawbacks however, among which that of being unsatisfactory when large quantities of liquid need to be dispensed with a powerful nebulisation.

The purpose of the present invention is to make a dispenser device which satisfies the aforesaid needs, overcoming the drawbacks mentioned with reference to the prior art.

The characteristics and advantages of the dispenser device according to the present invention will be made evident from the description which follows, made by way of a non-limiting example, according to the attached drawings wherein:

FIG. 4 shows a perspective view of a main body with a terminal duct and nozzle of the head in FIG. 1.

Figure 2:
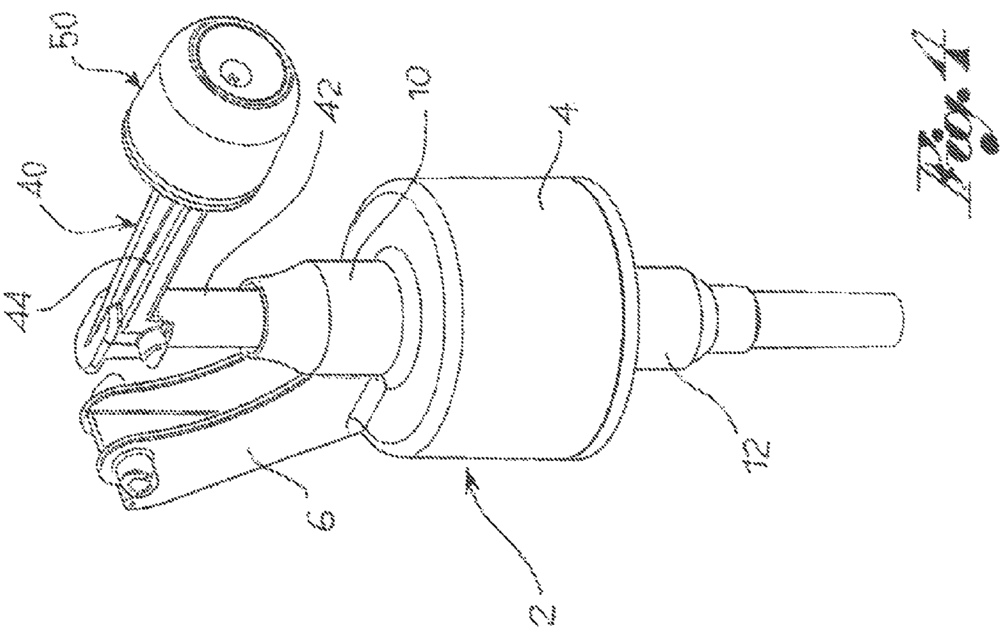
FIG. 2 shows a cross-section of the dispenser head in FIG. 1.

The dispenser head 1 comprises a main body 2 comprising an annular collar 4, generally cylindrical, having a body axis X, in which it houses, at least partially, the neck of the container in the assembled configuration of the head 1 on said container. The collar 4 extends therefore from a lower end 4*a*, open for the insertion of the neck, to an upper end 4*b*.

According to a preferred embodiment, the main body 2 can be coupled to the container by means of elastically deformable fins 2*a* projecting radially inwards to the collar for example from a skirt 2*b* inside said collar.

The main body 2 comprises in addition a branch 6 which projects from the collar 4; in particular, the branch 6 extends along the body axis X, preferably radially external to said body axis X.

The branch 6 extends therefore from one end 6*a* proximal to the collar 4, at the upper end 4*a* of said collar, and an opposite free distal end 6*b*.

Preferably, the branch 6 is arched, concave on the side facing the body axis X.

Preferably, in addition, the collar 4 and the branch 6 are made in one piece, for example by moulding, preferably in plastic material.

According to a preferred embodiment, the distal end 6*b* of the branch 6 is radially external to the collar 4, so as to increase the distance of said distal end from the body axis X.

According to a preferred embodiment, in addition, the main body 2 comprises a crown-shaped base 8, joined to the collar 4 at the upper end 4*a* of the latter.

Preferably, in addition, the main body 2 comprises a guide tube 10, joined to the inner rim of the crown-shaped base 8 and having a mainly axial extension.

The dispenser head 1 comprise, in addition, pumping means suitable for being manually activated to dispense the liquid outside the head.

The pumping means comprise a main cylinder 12 extending mainly along the body axis X between an upper end 12*a*, supported inside the main body, for example near the upper end 4*a* of the collar 4, and a lower end 12*b*, projecting axially outside the collar 4.

At the lower end 12*b*, the main cylinder 12 has a supply entrance 14 communicating with the container to supply the liquid to the main cylinder 12.

The head 1 comprises non return means able to allow the transit of the liquid from the container to the main cylinder 12 and to prevent the return of the liquid from the main cylinder 12 to the container.

For example, the non-return means comprise a spheroid 15 positioned at the entrance 14 of the main cylinder, resting on a conical seat 15*b*.

The pumping means comprise, in addition, according to a preferred embodiment, a piston 16 sliding axially and sealed in the main cylinder 12.

The compartment in the main cylinder 12 between the piston 16 and the spheroid 14 defines a compression chamber 18 for the liquid.

Preferably, the piston 16 has an inner duct 20, opening towards the compression chamber 18 and in fluidic communication with the external environment.

In a preferred embodiment, the head 1 comprises an obturator 22 which acts in conjunction with the piston 16 so that in a closed configuration the obturator obstructs the access of the liquid from the compression chamber 18 to the inner duct 20 and in an open configuration allows such access.

The obturator 22 embodies an example of dispensing means sensitive to the pressure of the liquid in the compression chamber 18 able to place the compression chamber 18 in fluidic communication with the external environment via a dispensing route when the pressure of the liquid in the compression chamber exceeds a threshold dispensing pressure.

The pumping means comprise, in addition, a tubular stem 24, extending axially, joined in translation to the obturator 22 and in fluidic communications, via several holes 26, with the inner duct 20 of the piston 16, in which said stem slides axially. The inside of the stem 24 is fluidically connected to the outside environment.

The stem 24 comprises an annular boss 27 extending radially.

The pumping means comprise, in addition, a highly resistant first spring 30, suitable to influence the piston to exert a pressure on the liquid in the compression chamber 18; for example, the first spring 30 is positioned between the annular boss 27 of the dispenser tube 24 and the piston 16.

The first spring 30 is defined "high resistance" in the sense that as a result of the characteristics of the material it is made of or of structural characteristics, it has a high resistance to compression.

The pumping means comprise, in addition, a second, low resistance spring 32 suitable to return the pumping means from the activation configuration to the rest configuration; for example, the second spring 32 is positioned in the compression chamber 18, against the obturator 22.

The second spring 32 is defined "low resistance" in the sense that as a result of the characteristics of the material it is made of or of structural characteristics, it has a low resistance to compression.

The dispenser head 1 comprises, in addition, a terminal duct 40 connected to the stem 24 and in fluidic communication with the outside environment to dispense the nebulised liquid; preferably the terminal duct 40 comprises an axial section 42 extending axially and connected to the stem, and a transversal section 44 extending along a dispensing axis Y, preferably incident to the body axis X, for example perpendicular to it.

The dispenser head 1 comprises, in addition, a rotating dispenser nozzle 50 connected to the end of the transversal section 44.

Said rotating nozzle embodies an example of opening/closing means able to be handled so as to obstruct/liberate the dispensing route and prevent/enable dispensing of the liquid to the outside.

The dispenser head 1 comprises, in addition, an operating arm 60 hinged to the branch 6 of the main body 2 in a hinging portion 60*b* and straddling the body axis X. In other words, the arm 60 extends so that the body axis X is incident to said arm.

In particular, the body axis X is outside the hinging portion 60*b*, that is, it does not intersect said hinging portion.

Even more specifically, the hinging portion 60*b* is radially external to the collar 4, so as to increase the distance of said hinge from the body axis X.

Preferably, the arm 60 is arched so as to be concave towards the main body 2.

Preferably, in addition, the arm 60 comprises an operating lever 62 which extends preferably towards the main body 2, radially external to the body axis X.

Preferably, the lever 62 is convex to the body axis X.

In particular, the lever 62 comprises a free end 62' opposite the hinging portion 60*b*; the free end 62' is radially distanced from the body axis X.

In particular, the body axis X is external to the free end 62' of the arm 60, in other words does not intersect said free end.

Even more in particular, the free end 62' is radially external to the collar 4, so as to increase the distance of said hinge from the body axis X.

The arm 60 presents, on the side opposite the point of hinging with the branch 6, an aperture 64, from which the terminal duct 40, and in particular the nozzle 50 project.

The arm 60 is engaged with the terminal duct 40, and in particular is in contact with it on the concave side, for example at a contact portion 60*a* of the arm 60, in the form of radial projections. In other words, the contact portion 60*a* is a cam acting on the terminal duct 40, and in particular on respective ears 44*a* projecting radially from the transversal section 44 of the terminal duct 40.

The head 1 comprises, in addition, removable safety means able to mechanically block sliding of the piston; for example, said safety means comprise a removable lock 70 which can be coupled to the axial section 42 of the terminal duct 40.

Figure 1:
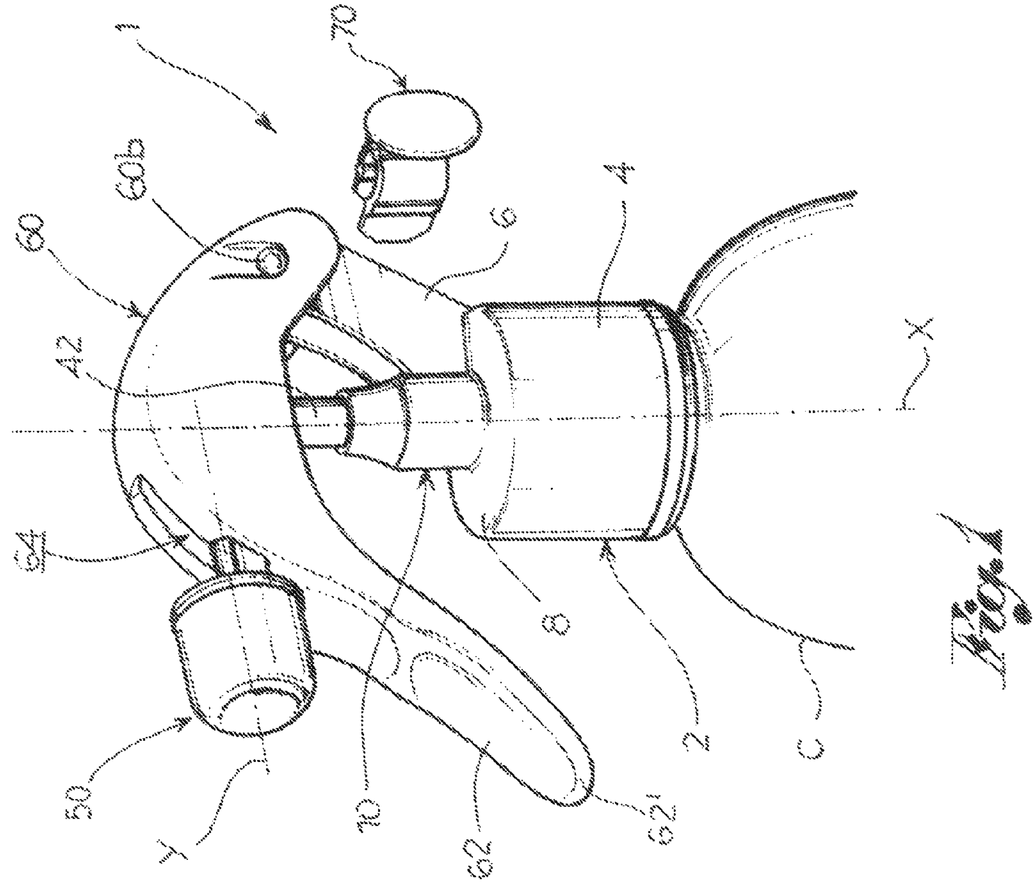
FIG. 1 shows a perspective view of a dispenser head according to the present invention, coupled to a container.
Figure 2:
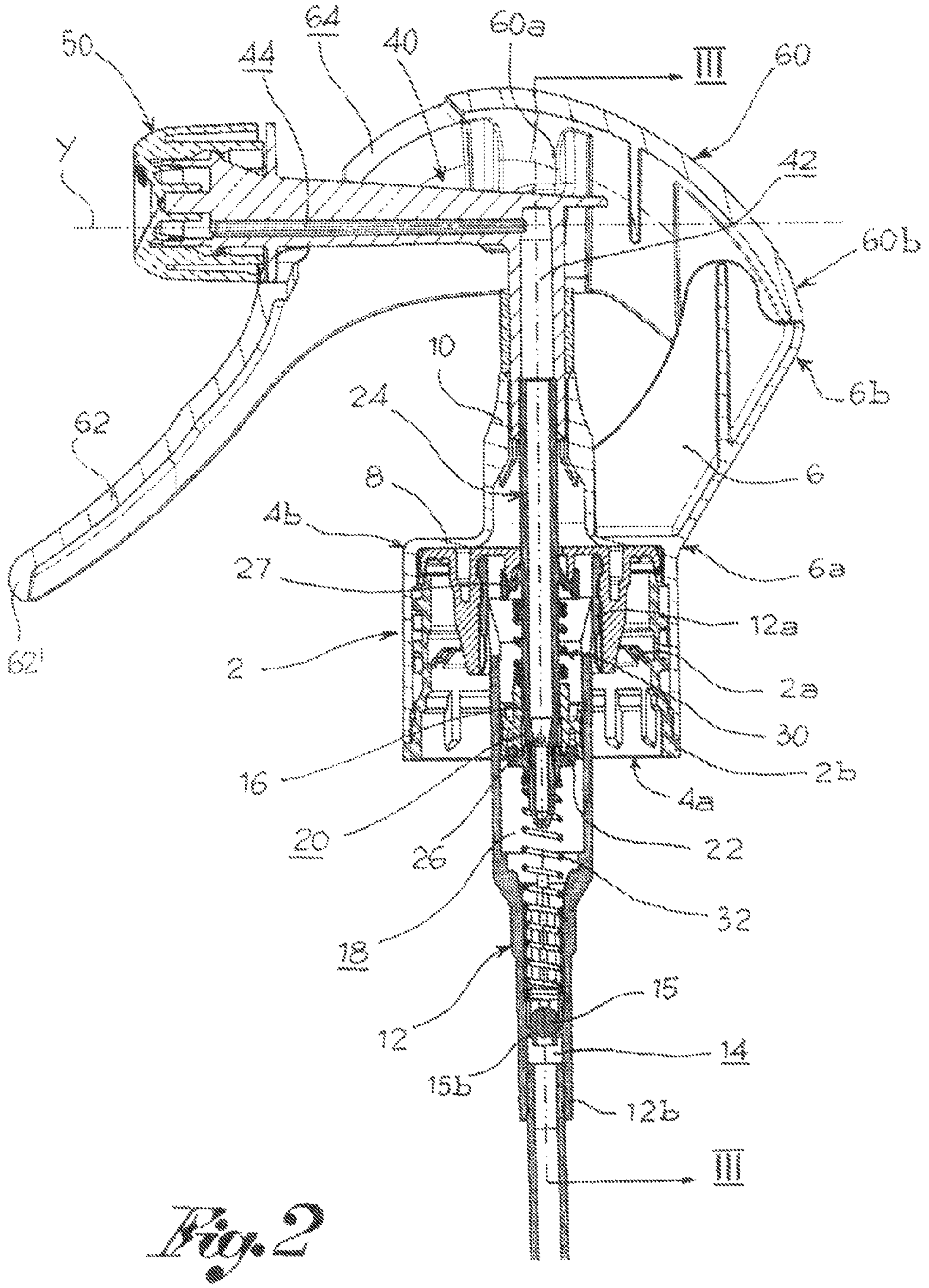
Figure 3:
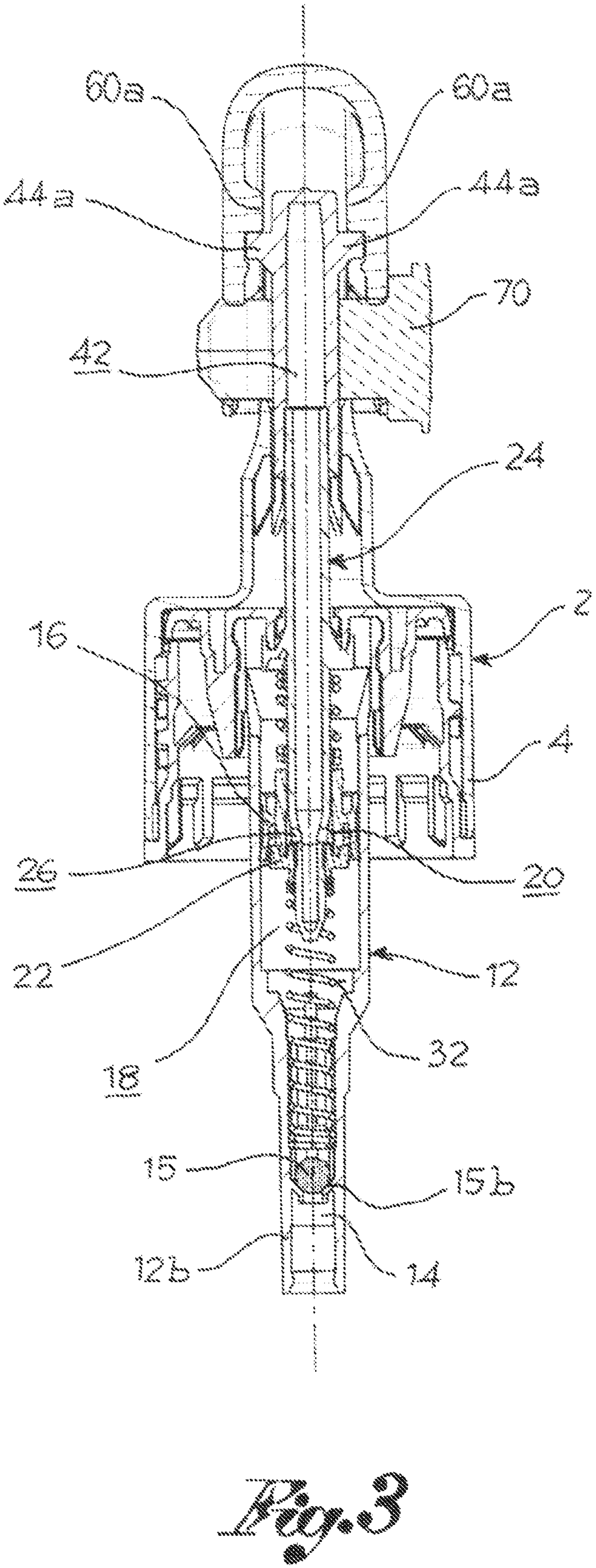
FIG. 3 shows a cross-section of the dispenser head in FIG. 1, according to the section line III-III in FIG. 2.

In a rest configuration (FIGS. 1 and 2), the obturator 22 prevents access from the compression chamber 18 to the inner duct 20 of the piston 16, and is therefore in abutment with said piston 16. The piston 16, the obturator 22, the dispensing tube 24, the terminal duct 40 are in the upper limit position; the lever 62 is released and the arm 60 is in the rest limit position.

When the head 1 is gripped so that the palm of the hand is in contact with the main body 2 on the branch side 6 and one or two fingers are on the lever 62, the head 1 is activated by a closing movement of the hand which makes the lever 62 and thus the arm 60 rotate so as to bring the lever 62 towards the main body 2.

The rotation of the arm 60 entails a kinematic translation of the contact portion 60*a* in the direction of the body axis X; in particular, from the rest configuration to a dispensing configuration, the contact portion 60*a* descends, translating towards the main body 2, that is approaches said central body.

The rotation of the arm 60 thereby induces lowering of the terminal duct 40, of the dispensing tube 24 and, given the presence of liquid in the compression chamber 18, compresses the high resistance spring 30 which pushes the piston 16 so as to compress the liquid in the compression chamber 18. The obturator 22, in such phase of incipient compression of the liquid, remains coupled to the piston 16 and thus prevents access to the inner duct 20.

In the phase of incipient compression, the high resistance spring acts substantially as a rigid spacer, transmitting the translation of the stem 24 to the piston 16.

In other words, the first spring 30 forms an elastically yielding element which transmits an axial translation movement to the piston.

The act of compressing the liquid present in the compression chamber 18, given the substantial impossibility of compressing liquid, significantly and rapidly raises the pressure of the liquid to a threshold dispensing pressure, the pressure acts on the obturator 22 and on the piston 16 so as to separate them: in particular, the pressure acts on the piston so as to oppose the action of the high resistance spring 30 and acts on the obturator so as to compress the low resistance spring 32; the difference in resistance between the springs causes the sudden detachment of the obturator from the piston.

In a dispensing configuration, the obturator 22 is therefore axially separate from the piston 16; the compression chamber 18 is in communication with the outside environment via the inner duct 20 of the piston 16, the stem 24 and the terminal duct 40, which thus define a dispensing route from the compression chamber 18 to the outside environment.

In addition, the high resistance spring which in any case yields axially, is slightly compressed.

The arm 60 is rotated in relation to the position assumed in the rest configuration, and in particular is rotated so that the contact portion 60*a* is closer to the main body 2.

Releasing the lever 62, the obturator 22 closes the inner duct 20 of the piston 16 and the low resistance spring 32 brings the head 1 back to the rest configuration.

The second spring 32 thereby constitutes an example of elastic return means.

During dispensing of the liquid, when the pressure in the compression chamber 18, which progressively decreases in volume, falls below the threshold dispensing pressure, the high resistance spring 30 brings the piston back into contact with the obturator.

Given the high resistance of the spring 30, the liquid is dispensed at a pressure very close to the threshold dispensing pressure, throughout the dispensing phase. Advantageously, this helps to produce a particularly fine nebulisation for the entire duration of dispensing.

The high pressure translates into a significant axial thrust impressed on the stem 24 and the terminal duct 40 by the contact portion 60*a*. Such significant thrust is obtained by an advantageous lever mechanism composed of the branch 6 and the arm 60.

Figure 5:
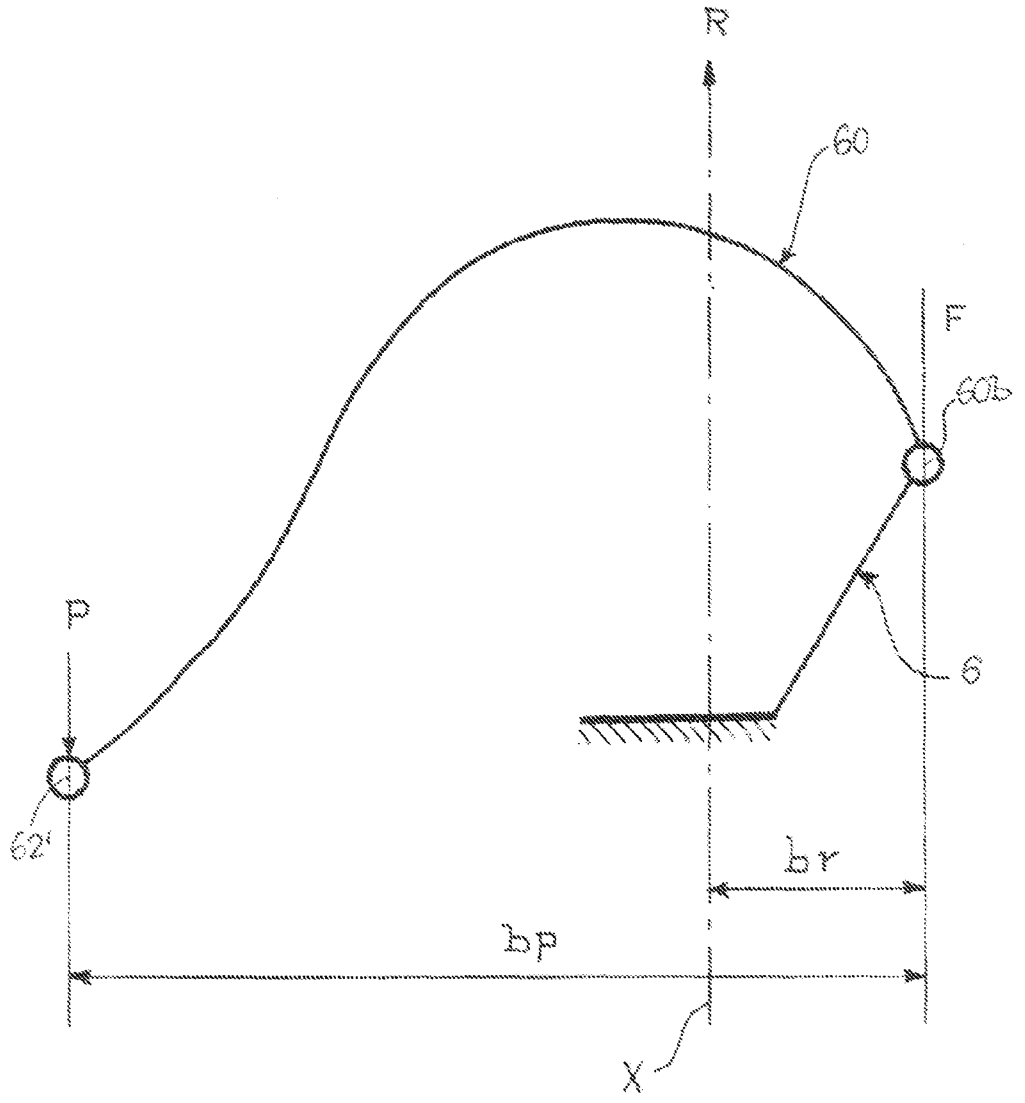
FIG. 5 shows a diagram of the lever mechanism of the head in FIG. 1.

FIG. 5 is a schematic diagram showing how, to obtain dispensing of the liquid, a resistance R, caused by the threshold dispensing pressure, must be overcome by means of a power P. In relation to the fulcrum F, that is the point of hinging between the branch 6 and the arm 60, the resistance R has a resistance arm br and the power P a power arm bp. Given the known laws of levers, P=R(br/bp).

The construction features of the head 1, and in particular the branch 6, the arm 60 and the lever 62, permit a bp/br ratio of 3 to 4, and in particular equal to 4. The power P is therefore about ¼ of the resistance R.

Innovatively, the dispenser head according to the present invention makes it possible to dispense a large dose of a liquid with a particularly fine nebulisation.

In particular, laboratory tests have shown how the average size of the nebulised drops of liquid are about 60 □m and the dose dispensed is about 0.6 ml. Such characteristics make the dispenser head particularly useful for the household air freshener sector, in that the very fine nebulisation enable the drops to remain suspended in the air for a longer time, while high doses of product are needed to freshen standard environments.

Advantageously, in addition, the head according to the present invention allows long range dispensing. Laboratory tests have shown how the average range of dispensing is 1 m. According to a further advantageous aspect, dispensing takes place in a wide aperture dispensing cone; laboratory tests have shown how the angle of aperture is about 35°/40°.

In the present invention, there can be provided a removable lock (e.g., a removable locking tab) for engagement with a substantially cylindrical liquid conduit of a manually operated hand-held trigger sprayer comprising:

a frame of resiliency rigid material having a head section and a legs section;

wherein the legs section comprises at least two legs configured into a substantially U-shaped clip for gripping, in use, the liquid conduit, the U-shaped clip having an inner and outer surface, and being connected from said outer surface to the head section;

wherein the head section comprises a grip portion configured to permit in use, a user to grip the locking tab to remove the tab from the trigger sprayer, and at least one stop member that extends substantially perpendicular to the at least two legs such that, in use, the stop member engages a part of a moveable trigger of the trigger sprayer.

Advantageously, the removable lock or tab according to the present invention is capable of resisting movement of a movable part of the trigger sprayer to prevent erroneous actuation of the trigger.

A further advantage of the removable lock or tab according to the present invention is the capacity of the at least one stop member to substantially prevent the rotation of the tab such that it is always in a substantially constant location which may ensure that the grip portion is physically available for inspection and/or removal by a user and does not become needlessly entangled or in conflict with other parts of the trigger mechanism which may prevent the trigger sprayer from operating or operating optimally when use thereof is desired by a user. Furthermore, said at least one stop member further advantageously assists in the assembly of trigger sprayers since the stop member may be arranged to engage the movable and/or non-movable part of the trigger which prevents damage being inflicted to the cylindrical liquid conduit when the tab is engaged therewith.

Preferably the inner surface of at least one of the at least two legs comprises at least one abutment means to improve the ability of the clip to engage the liquid conduit. The inner surface of each leg can comprise an abutment means, preferably facing the abutment means on the inner surface of the opposing leg.

The legs section preferably comprises two legs to form the U-shaped clip. The legs preferably are sized to possess a depth that almost completely corresponds to the maximum available height of the substantially cylindrical liquid conduit such that, in use of the removable lock or tab with a trigger sprayer, the removable lock or tab almost substantially corresponds to the distance of the liquid conduit defined between movable parts and a non-movable part of the trigger adjacent the conduit. In other words, the removable lock or tab is preferably sized to fill the gap between the movable and non-movable parts of the trigger around the liquid conduit such that actuation of the trigger when the removable lock or tab is engaged with the liquid conduit is resisted by the movable part of the trigger bearing against an upper part of the removable lock or tab whilst the lower part of the removable lock or tab bears against the non-moveable part of the trigger to resist said movement actuating the trigger sprayer.

Preferably the legs section of the frame connects to the at least one stop member which is connected to the grip portion.

The removable lock or tab may be provided with at least two stop members extending substantially perpendicular to the at least two legs. The at least two stop members may extend substantially equally to permit, in use, the removable lock or tab to be fixed to the liquid conduit without a directional orientation of said stop members being required for ease of assembly. Alternatively, the at least two stop members may extend such that one of said members can, in use, engage a part of a moveable trigger of the trigger sprayer and the other of said members can, in use, engage a non-movable part of the trigger mechanism, thus imparting a single directional orientation requirement on the removable lock or tab, but improving the ability of the removable lock or tab to resist movement of the movable part of the trigger. As a further alternative or additional arrangement, the removable lock or tab may be provided with one or more stop members that extend non-perpendicular to the at least two legs to, in use, engage a non-movable part of the trigger mechanism, thus imparting a single directional orientation requirement on the removable lock or tab, but improving the ability of the removable lock or tab to resist movement of the movable part of the trigger.

The grip portion is preferably configured to extend radially to provide a convenient shape to allow a user to remove, in use, the removable lock or tab from the liquid conduit. Additionally, the grip portion may be configured to extend sufficiently radially to permit user instructions to be present on the side of the portion facing a user and remote from the stop member and legs section. The instructions could be words or pictures printed on or moulded into said side. Additionally or alternatively, the grip portion may be configured to extend into any shape which is convenient for a user to obtain sufficient purchase between the user's thumb and finger to permit the removal, in use, of the tab from the liquid conduit.

Preferably, the removable lock or locking tab is sized such that both the legs at one end of the tab and the grip portion at the other end of the removable lock or tab are in-board of the width of a trigger sprayer and/or the width of a liquid container to be connected to said trigger sprayer such that, in use, the removable lock or locking tab does not affect the distribution or stacking of a trigger sprayer when connected to a container of liquid. This in-board arrangement may also improve the handling of the removable lock or tab and trigger sprayer on a production line since the removable lock or tab will not be snagged by off-line obstructions as it passes down tie production line.

Ideally, the removable lock or locking tab is integrally moulded to form a single piece component in order to improve its structural rigidity.

Preferably, the removable lock or locking tab is sufficiently robust to permit, in use, a user to remove the tab from the trigger sprayer to use the sprayer and reconnect the tab thereafter to again resist the movement of the moveable part of the trigger for improved safety of storage; this is considered to be particularly useful to improve the safety of trigger sprayers where children may be able to obtain access thereto.

Figure 6:
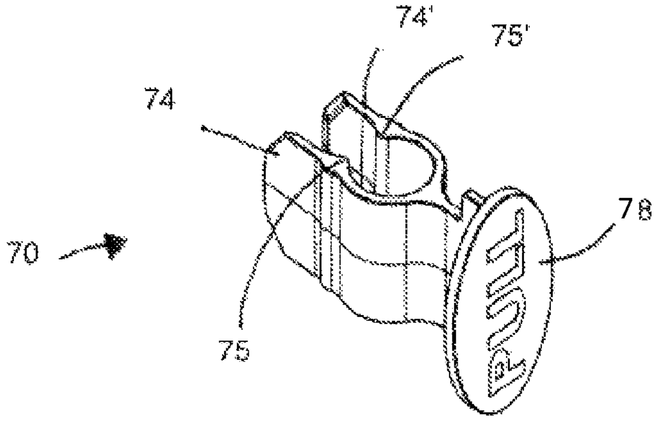
FIG. 6 illustrates a perspective view of a removable lock or locking tab according to the present invention.
Figure 7:
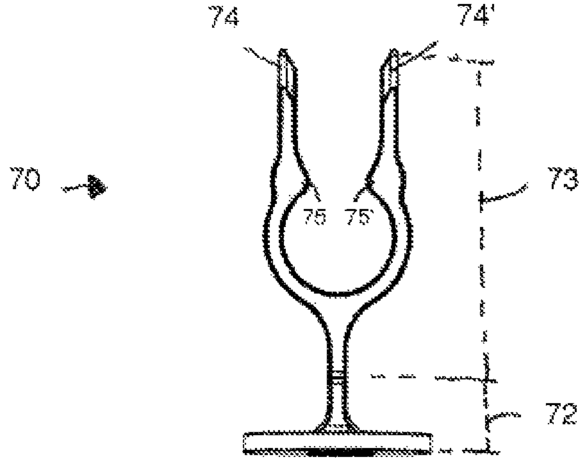
FIG. 7 illustrates a plan view of a removable lock or locking tab according to the present invention.
Figure 8:
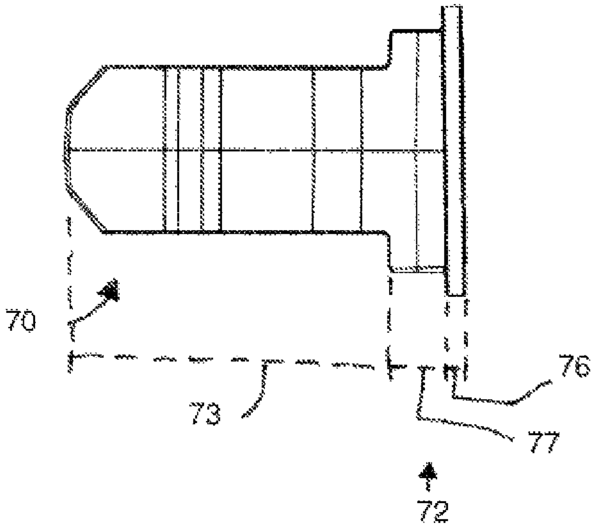
FIG. 8 illustrates a side view of a removable lock or locking tab according to the present invention A dispenser device comprises a dispenser head 1 and a container C to contain the liquid; the dispenser head 1 can be mechanically joined to a neck of the container.

Generally referring to FIGS. 6-8, a removable lock or locking lab 70, according to the present invention, is illustrated. The removable lock or tab 70 includes a frame of having a head section 72 and a legs section 73. The removable lock or tab 70 is made of a resiliently rigid material, such as a plastics material, although it could be made out of metal or a combination thereof, however, for cost purposes, it is preferably made out of a plastics material.

The legs section 73 comprises at least two legs 74, 74' configured into a substantially U-shaped clip. On the inner surface of the legs 74, 74' are abutment means 75, 75' in the form of protruding barbs which are intended to promote the ability of the clip to releasably engage a liquid conduit of a trigger sprayer, this will be discussed further below.

The removable lock or tab 70 extends from substantially the mid-point of the outer surface of the U-shaped clip to form the head section 72. The head section 72 is made up of a grip portion 76 and stop members 77. The stop members 77 both extend substantially perpendicular to the legs 74, 74' to extend above and below the depth of the legs 74, 74'. The operation of the stop members 77 will be discussed below.

The grip portion 76 extends radially from the stop members 77 to permit, in use, a user to grip the removable lock or locking tab 70 to remove the removable lock or tab from a trigger sprayer. As can be seen on FIG. 6, the grip portion 76 extends sufficiently radially to permit user instructions to be present on the side 78 of the grip portion 76 facing a user. The instructions of "PULL" are formed as part of the moulding of the removable lock or tab 70, however, the side 78 could be printed on or have a sticker applied thereto.

Although not illustrated, the grip portion 76 could be configured to extend into any shape which is convenient for a user to obtain sufficient purchase between the user's thumb and finger to permit the removal, in use, of the tab from the liquid conduit, although with some shapes, it may not be possible to present user instructions thereon, and, in that arrangement, the shape would need to be such that it would be intuitive for the user to understand its purpose and associated mode of operation.

The removable lock or tab 70 is moulded to form a single piece component to order to improve its structural rigidity, however, the removable lock or tab 70 could be moulded or formed as a multi-component piece for subsequent assembly. Regardless of the single or multi-piece construction, the removable lock or tab 70 should preferably be sufficiently robust to permit a user to remove the tab from the trigger sprayer to use the sprayer and reconnect the tab thereafter and repeat throughout at least the lifetime of the liquid container present with the trigger sprayer in order to improve the safety associated with storage thereof. This improved safety is considered to be particularly useful to improve the safety of trigger sprayers where children may be able to obtain access thereto.

These characteristics too are particularly useful in the air fresheners sector, in that they enable distribution of the product over a wider area.

It is clear that a person skilled in the art may make modifications to the dispenser head described above so as to satisfy contingent requirements.

For example, in one embodiment variation, the main body can be joined to the container by means of threading.

Such variations too fall within the sphere of protection as defined by the following claims.

The invention claimed is:

1. A removable locking tab for engagement with a substantially cylindrical liquid conduit of a manually operated handheld trigger sprayer comprising:

a frame of resiliently rigid material having a head section and a legs section;

wherein the legs section comprises at least two legs configured into a substantially U-shaped clip for gripping, in use, the liquid conduit, the U-shaped clip having an inner and outer surface, and being connected from said outer surface to the head section, wherein the at least two legs have a depth;

wherein the head section comprises a grip portion configured to permit, in use, a user to grip the locking tab to remove the tab from the trigger sprayer, and the grip portion has at least one stop member that extends substantially perpendicular to the at least two legs such that, in use, the stop member engages a part of a moveable trigger of the trigger sprayer, and the grip portion has a side which, in use, faces a user and is remote from the at least one stop member and the at least two legs, wherein the grip portion extends radially from the at least one stop member and above and below the depth of the legs.

2. A locking tab according to claim 1, wherein the inner surface of at least one of the at least two legs comprises at least one abutment means.

3. A locking tab according to claim 1, wherein the legs section comprises two legs to form the U-shaped clip.

4. A locking tab according to claim 1, wherein the legs section of the frame connects to the at least one stop member which is connected to the grip portion.

5. A locking tab according to claim 1, the tab is provided with at least two stop members extending substantially perpendicular to the at least two legs.

6. A locking tab according to claim 5, wherein the at least two stop members extend substantially equally.

7. A locking tab according to claim 1, wherein the grip portion is configured to extend radially outward from the at least one stop member.

8. A locking tab according to claim 7, wherein the grip portion is configured to extend sufficiently radially outward from the at least one stop member to permit user instructions to be present on the side of the portion facing a user and remote from the stop member and legs section.

9. A locking tab according to claim 1, wherein the locking tab is sized such that both the legs at one end of the tab and the grip portion at the other end of the tab are in-board of the width of a trigger sprayer and/or the width of a liquid container to be connected to said trigger sprayer.

10. A locking tab according to claim 1, wherein said tab is integrally moulded to form a single piece component in order to improve its structural rigidity.

11. A manually operated hand-held trigger sprayer with a removable locking tab, wherein the trigger sprayer comprises:

a housing having body configured to be connectable to a liquid container and provided with a non-movable body part with a pivoting connection to a moveable trigger part, the housing being further provided with a substantially centrally located liquid conduit which is connected to a liquid outlet at one end thereof, said liquid conduit being substantially cylindrical; and wherein the locking tab has a frame of resiliently rigid material having a head section and a legs section wherein the legs section comprises at least two legs configured into a substantially U-shaped clip for releasably gripping the liquid conduit, the U-shaped clip having an inner and outer surface, and being connected from said outer surface to the head section, wherein the at least two legs have a depth, and wherein the head section comprises a grip portion configured to permit, in use, a user to grip the locking tab to remove the tab from the liquid conduit, and the grip portion has at least one stop member that extends substantially perpendicular to the at least two legs to releasably engage the moveable trigger part, and the grip portion has a side which, in use, faces a user and is remote from the at least one stop member and the at least two legs, and wherein the grip portion extends radially from the at least one stop member and above and below the depth of the legs.

12. A manually operated hand-held liquid trigger spraying device with a removable locking tab comprising a container of liquid connected to a trigger sprayer which comprises:

a housing having a body connected at one end to the liquid container and provided at its other end with a non-movable body part with a pivoting connection to a moveable trigger part, the housing being further provided with a substantially centrally located liquid conduit which is connected to a liquid outlet at one end thereof, said liquid conduit being substantially cylindrical; and wherein the locking tab has a frame of resiliently rigid material having a head section and a legs section wherein the legs section comprises at least two legs configured into a substantially U-shaped clip for releasably gripping the liquid conduit, the U-shaped clip having an inner and outer surface, and being connected from said outer surface to the head section, wherein the at least two legs have a depth, and wherein the head section comprises a grip portion configured to permit, in use, a user to grip the locking tab to remove the tab from the liquid conduit, and the grip portion has at least one stop member that extends substantially perpendicular to the at least two legs to releasably engage the moveable trigger par, and the grip portion has a side which, in use, faces a user and is remote from the at least one stop member and the at least two legs, and wherein the grip portion extends radially from the at least one stop member and above and below the depth of the legs.

13. A locking tab according to claim 1, wherein user instructions are present on the side of the grip portion.

14. A locking tab according to claim 4, wherein the legs have a depth, and the stop member extends below and above the depth of the legs.

15. A manually operated hand-held trigger sprayer according to claim 11, wherein user instructions are present on the side of the grip portion.

16. A manually operated hand-held trigger sprayer according to claim 11, wherein the at least one stop member is capable of preventing rotation of the locking tab such that the locking tab is always in a substantially constant location.

17. A manually operated hand-held trigger sprayer according to claim 11, wherein the at least one stop member is engageable to a movable and/or non-movable part of the trigger.

18. A manually operated hand-held trigger sprayer according to claim 11, wherein the removable locking tab is reconnectible and reusable on the trigger sprayer after a removal therefrom.

19. A manually operated hand-held liquid trigger spraying device according to claim 12, wherein user instructions are present on the side of the grip portion.

20. A manually operated hand-held liquid trigger spraying device according to claim 12, wherein the at least one stop member is capable of preventing rotation of the locking tab such that the locking tab is always in a substantially constant location.

* * * * *